United States Patent
Ishida et al.

(10) Patent No.: US 6,242,836 B1
(45) Date of Patent: *Jun. 5, 2001

(54) VEHICLE AC GENERATORS STATOR AND METHOD OF MANUFACTURING THE SAME

(75) Inventors: Hiroshi Ishida; Shinichi Matsubara, both of Anjo (JP)

(73) Assignee: Denso Corporation, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,681

(22) Filed: Jun. 21, 1999

(30) Foreign Application Priority Data

Jun. 26, 1998 (JP) .................................... 10-180755

(51) Int. Cl.⁷ .................................... H02K 3/34
(52) U.S. Cl. ........................ 310/215; 310/201; 310/42; 29/596
(58) Field of Search .................... 310/201, 215, 310/214, 202, 203, 204, 205, 206, 207, 208, 195, 42; 29/596

(56) References Cited

U.S. PATENT DOCUMENTS

| | | | |
|---|---|---|---|
| 1,675,419 | * 7/1928 | Myers | 310/215 |
| 1,822,261 | 9/1931 | Apple | 310/201 |
| 2,407,935 | * 9/1946 | Perfetti et al. | 310/201 |
| 2,581,862 | * 1/1952 | Johnson et al. | 310/201 |
| 2,928,963 | 3/1960 | Bertsche et al. | 310/201 |
| 4,710,657 | 12/1987 | Ocken et al. | 310/62 |
| 4,922,165 | * 5/1990 | Crawford et al. | 310/215 |
| 5,097,167 | 3/1992 | Kanayama et al. | 310/201 |
| 5,298,824 | 3/1994 | Franz | 310/89 |
| 5,763,978 | * 6/1998 | Uchida et al. | 310/215 |

FOREIGN PATENT DOCUMENTS

| | | | |
|---|---|---|---|
| 0 881 747 | 12/1998 | (EP) | H02K/3/24 |
| 2 594 271 | 8/1987 | (FR) | H02K/1/26 |
| 50-47102 | 4/1975 | (JP) | H02K/3/12 |
| 62-272836 | 11/1987 | (JP) | H02K/3/04 |
| 63-274335 | 11/1988 | (JP) | H02K/3/04 |
| 8-80001 | 3/1996 | (JP) | H02K/3/487 |
| 8-205441 | 8/1996 | (JP) | H02K/3/12 |
| 92/06527 | 4/1992 | (WO) | H02K/3/12 |

OTHER PUBLICATIONS

Patent Abstracts of Japan, vol. 012, No. 1018, Apr. 7, 1988.
Patent Abstracts of Japan, vol. 008, No. 256, Nov. 22, 1984.

* cited by examiner

*Primary Examiner*—Nestor Ramirez
*Assistant Examiner*—B Mullins
(74) *Attorney, Agent, or Firm*—Pillsbury Winthrop LLP

(57) ABSTRACT

In a stator of a vehicle ac generator, a slot insulator has a portion closing the opening of a slot. Therefore, portions of the stator winding disposed in the slot can be retained in the slot without an additional member, and water or the like can be shut out.

8 Claims, 3 Drawing Sheets

US 6,242,836 B1

VEHICLE AC GENERATORS STATOR AND METHOD OF MANUFACTURING THE SAME

CROSS REFERENCE TO RELATED APPLICATION

The present application is based on and claims priority from Japanese Patent Application Hei 10-180755, filed on Jun. 26, 1998, the contents of which are incorporated herein by reference.

BACKGROUND OF THE INVENTION

1. Field of the Invention

The present invention relates to an ac generator's stator for a passenger car or a truck and a method of manufacturing the same.

2. Description of the Related Art

An insulating structure between a stator core and a stator winding of an ac generator's stator for a vehicle is disclosed in JP-A-8-80001, in which insulation film sheets are disposed between slot walls and the stator winding. Each slot has an opening formed at the inner periphery of the stator core, which is closed by a separate press-fitted wedge member to retain in-slot portions of the stator winding inside the slot.

Because the insulation film member and the press-fitted insulation member are separate in such a stator core, small gaps are necessarily formed between the two members. When a rotor rotates inside the stator, pressure near the slot openings rises. As a result, snow mixed with salt or salt water may be introduced into the slots through the small gaps by the cooling air blowing on the stator winding. This causes electrolyzation of the in-slot portions of the stator winding thereby resulting in insulation failure of the stator winding.

On the other hand, the space factor of the in-slot portions of the stator winding has been increased to satisfy recent demand for increasing output power of the vehicle ac generator. The separate wedge member has become an obstacle to increasing in the space factor.

SUMMARY OF THE INVENTION

Therefore, an object of the invention is to provide an ac generator's stator for a vehicle that has improved insulation structure formed between the stator winding and the stator core and a method of manufacturing such a stator.

In a stator of a vehicle ac generator according to a preferred embodiment of the invention, each of slot insulators has a closing portion closing the opening of slot. Therefore, electric conductors can be held within the slots without additional retaining members. In addition, the closing portion can shut out salt water or other electrolyte easily.

As a result, the insulation coating of the stator winding is free from damage otherwise caused by some of the wedge members being press-fitted into the slots.

Each of the insulators can be a roll of a rectangular sheet with opposite sides overlapping with each other to fit to the inner periphery of the slot. The insulators can be formed in a tubular fashion.

In a method of manufacturing the stator according to a preferred embodiment of the invention, a bundle of the in-slot portions is enclosed by an insulator sheet. Then, bundles of in-slot-portions are inserted into all the slots, and connecting portions extending from the bundles are connected to one another to form the stator winding.

Each of the insulators can be inserted into one of the slots and disposed to fit the entire peripheral surface of the slot and to close the opening of the slot before the conductors are inserted into the slot from one axial end of the stator core.

Thus, the ac generator's stator for a vehicle according to an embodiment of the invention can be manufactured easily.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
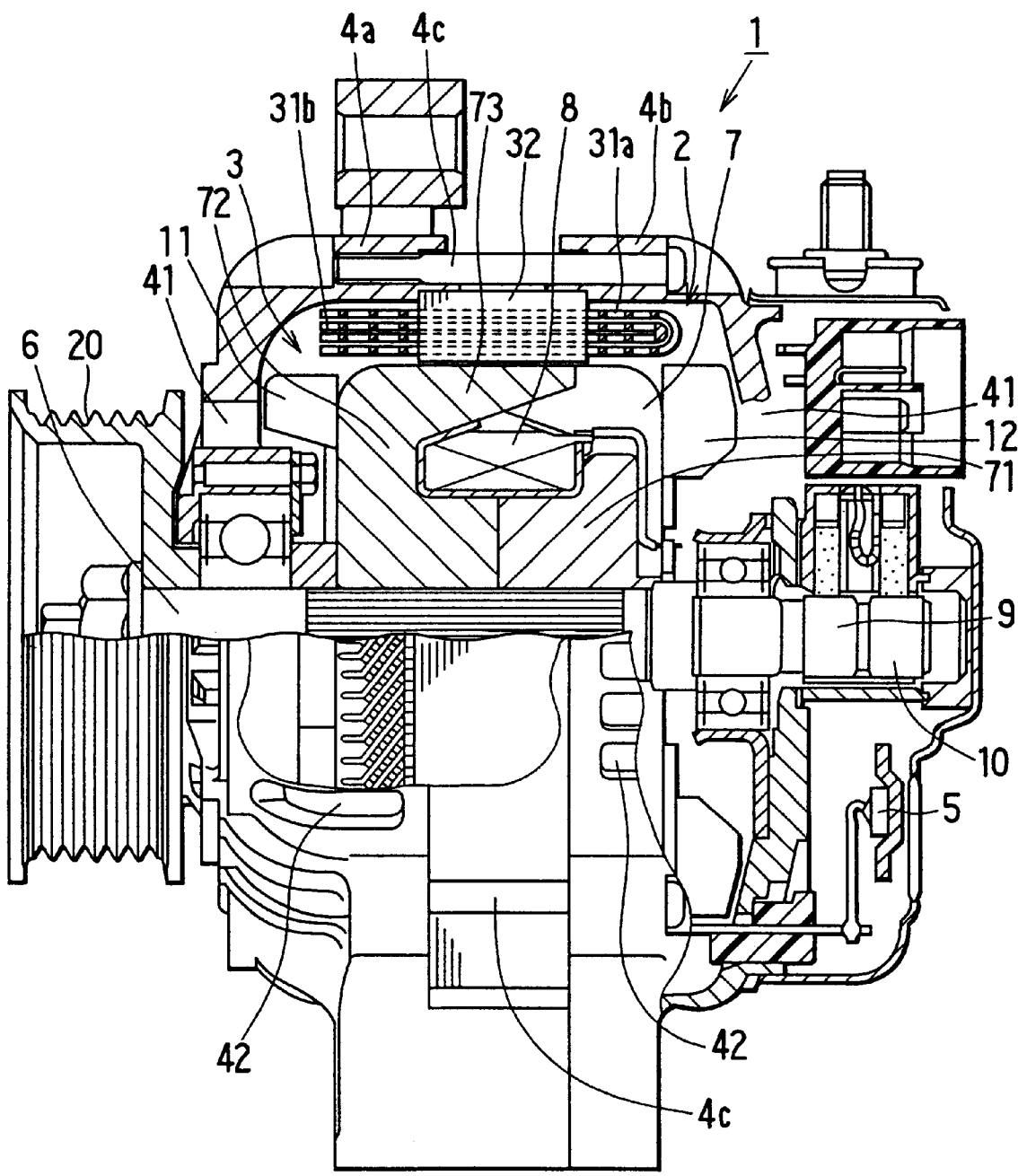
FIG. 1 is a cross-sectional view of an ac generator for a vehicle having a stator according to an embodiment of the invention.

A stator according to a first embodiment of the invention is described with reference to FIGS. 1–4. Vehicle ac generator 1 includes stator 2, rotor 3, front housing 4a and rear housing 4b and ac-dc converting rectifier 5. Front and rear housings 4a and 4b support stator 2 and rotor therebetween by a plurality of bolts 4c.

Rotor 3 has shaft 6, pole core 7, field coil 8, slip rings 9, 10, and mix-flow fan 11 and centrifugal fan 12. Shaft 6 is fixed to pulley 20 to be driven by an engine (not shown) mounted in a vehicle.

Pole core 7 has a pair of pole core members, each of which has boss portions 71, disk portions 72 and six claw-pole-pieces 73.

Front housing 4a and rear housing 4b respectively have air inlets 41 at the axial ends thereof and air outlets 42 at the outer periphery thereof around coil ends 31a, 31b.

Stator 2 has annular stator core 32 and a three-phase ac stator winding.

Stator core 32 is a lamination of thin steel sheets having thirty six parallel-sided slots 30 formed at the inner periphery thereof, a plurality of yoke portions 32a and a plurality of tooth-edges 32b.

Figure 2:
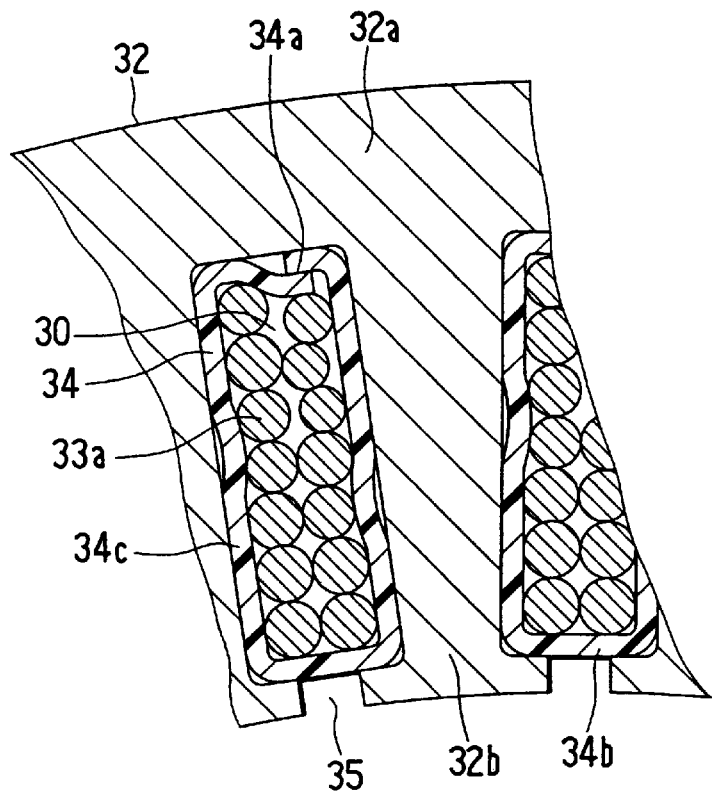
FIG. 2 is a fragmentary cross-sectional view of the stator according to a first embodiment of the invention.

As shown in FIG. 2, each slot 30 accommodates a plurality of conductor segments therein, which are insulated from stator core 32 by insulators 34.

Figure 3:
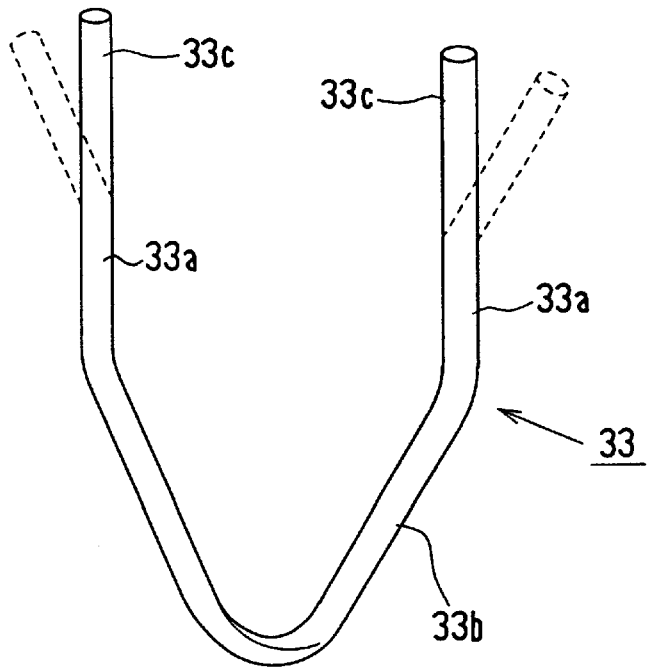
FIG. 3 is a perspective schematic diagram of a segment inserted into a stator core according to the first embodiment of the invention.

The stator winding is composed of a plurality of U-shaped conductor segments 33 made of round copper wire connected in a prescribed pattern. As shown in FIG. 3, each conductor segment 33 has a continuous U-shaped crossing portion 33b, a pair of in-slot portions 33a and a pair of connecting portions 33c. U-shaped portion 33b is disposed at an axial end of stator core 32 and continuously connecting one of the pair of in-slot portion 33a disposed in one slot 30 and the other in-slot portion 33a disposed in another slot 30. Each of the pair of connecting portions 33c extends from one of the above in-slot portions 33a and is disposed at the other axial end of stator core 32 to be respectively welded to another connecting portion of another segment 33 extending from different one of slots 30.

Figure 4:
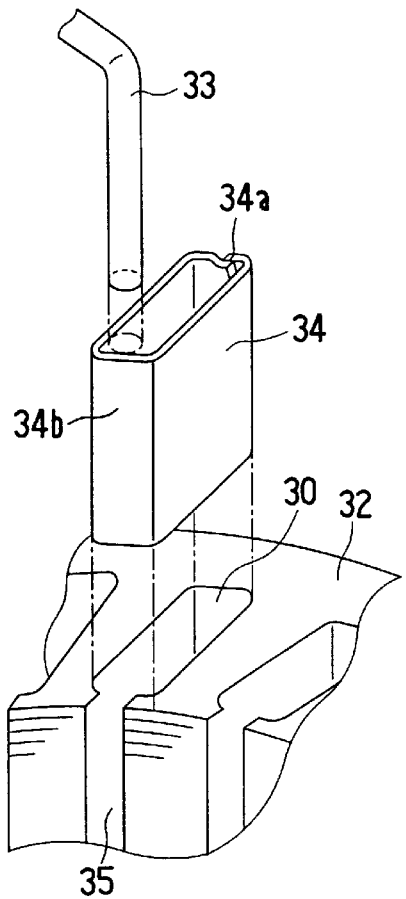
FIG. 4 is a perspective diagram illustrating the segment according to the first embodiment being inserted into a slot.

As shown in FIG. 4, insulator 34 is made of a generally rectangular insulation sheet that has axially extending sides overlapped with each other at overlap portion 34a to form an axially extending cylinder. Insulators 34 are inserted from one axial end of stator core 32 into slots 30 with overlap portions 34a being at radially outer wall of slots 30, so that slot openings 35 are respectively closed by closing portions 34b. Overlap portions 34a can be disposed anywhere other than slot openings 35 to have the same effect as the above.

Thereafter, segments 33 are inserted into slots 30 from one end of stator core 32 so that two in-slot portions 33a thereof are respectively inserted into two slots 30 spaced apart a prescribed pole pitch from each other.

Then, connecting portions 33c are bent oppositely in the circumferential direction as shown by broken lines in FIG. 3. Each end of connecting portions 33c is welded to an end of connecting portion 33c of another segment 33 to form a three-phase ac winding.

Thus, slot openings 35 are closed without gaps, and segments 33 are retained inside slots 30 without using specific retainer members. Because it is not necessary to press-fit separate wedge members into slots 30, any damage on segments 33 such as scratches or problems in inserting such members can be avoided. Moreover, the space factor of conductor segments 33 in slots can be increased.

Segments 33 and insulators 34 can be easily inserted into slots 30 from the same axial end of stator core 32 jointly or separately. Therefore, it is possible to put segments 33 in slots 30 in proper order to increase the space factor, resulting in reduction in resistance of the stator winding and higher output power of the ac generator.

Figure 5:
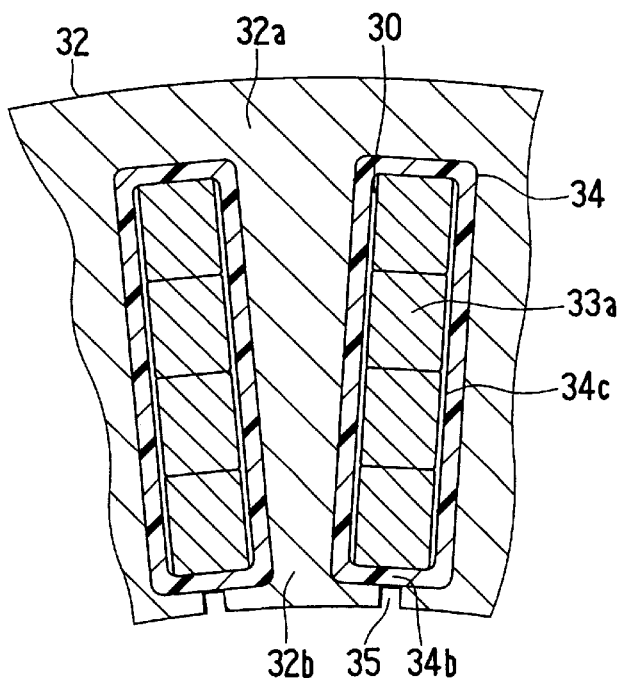
FIG. 5 is a fragmentary cross-sectional view of a stator according to a second embodiment.

As shown in FIG. 5, U-shaped segment 33 can be made of a conductor wire having a rectangular shape in cross-section fitted to slot 30. If insulators having overlap portion 34a are used, overlap portions 34a are preferably position on the radial line to which segments 33 are aligned, as shown in FIG. 2, because the overlap portion 33a is surely pressed down by the aligned segments 33. Instead of the insulator 34 having overlap portions 34a, seamless tubular insulator 34 can be also used. Smooth tubular insulator 34 can be made by bonding opposite edges of a rectangular insulation film or nonwoven sheet.

The size and shape of tubular insulators 34 and rectangular segments 33 correspond to those of slots 30, thereby reducing unnecessary gaps.

Because segments 33 are held by friction force via insulators 34, vibration resistance can be improved.

Insulators 34 can be inserted into slots 30 from slot openings 35 instead of the axial end of the stator core. Segments 33 together with insulators 34 can be also inserted from slot openings 35.

A plurality of in-slot portions 33a can be wrapped by a sheet of insulator 34 or inserted into tubular insulator 34 beforehand. The stator winding can be formed of continuous wire in a well-known manner. In this case, a prescribed number of turns are formed and wrapped by sheet insulators 34 beforehand. Thereafter, they are inserted into slots 30 from slot openings 35. Insulators 34 are rotated so that overlap portions 34a can be disposed at radially outer portion of slots 30.

Rod-like segments can be also used instead of U-shaped segments.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of a vehicle ac generator including:

a stator core having a plurality of slots along an inner periphery thereof, each slot including a peripheral portion and an opening;

a plurality of electric conductors having in-slot portions disposed in said slots and connecting portions disposed outside said slots; and insulators structured to insulate said in-slot portions from said stator core;

wherein each of said insulators is disposed (i) at least along the peripheral portion and the opening and (ii) at a position other than between said in-slot portions; and wherein each of said insulators is a roll of a rectangular sheet having opposite sides overlapping with each other, the overlapping sides being positioned at least along the peripheral portion, thereby enclosing said in-slot portions to retain said in-slot portions and to shut out foreign particles.

2. The stator as claimed in claim 1, wherein said opposite sides are disposed at a radially outer side of said slot.

3. The stator as claimed in claim 1, wherein said insulator is a tubular member.

4. The stator as claimed in claim 1, wherein said plurality of electric conductors are connected to one another to form a stator winding.

5. The stator as claimed in claim 1, wherein each of said in-slot portions has a rectangular shape in cross-section fitted into said slot.

6. A method of manufacturing a stator as claimed in claim 1 comprising:

a step of enclosing a bundle of said in-slot portions by an insulator sheet, a step of inserting said bundle with said insulator sheet into each of said slots, and step of connecting one of said connecting portions extending from said bundle of said in-slot portions to another to form a stator winding.

7. A method of manufacturing a stator as claimed in claim 1 comprising:

a step of inserting said insulators into said slots to fit entire peripheral surface thereof and to close an opening of said slot, a step of inserting a bundle of said in-slot porting into each of said slots from one axial end of said stator core, and a step of connecting one of said connecting portions extending from said bundle to another to form said stator winding.

8. A stator of claim 1, wherein said insulators retain said in-slot portions in said slots without any additional retaining member.

* * * * *